March 16, 1943.   C. A. OLCOTT   2,314,286
GEAR DRIVE FOR CENTRIFUGAL MACHINES
Filed May 24, 1938   3 Sheets-Sheet 1

INVENTOR
CHARLES A. OLCOTT
BY HIS ATTORNEYS
Howson and Howson

March 16, 1943.    C. A. OLCOTT    2,314,286
GEAR DRIVE FOR CENTRIFUGAL MACHINES
Filed May 24, 1938    3 Sheets-Sheet 2
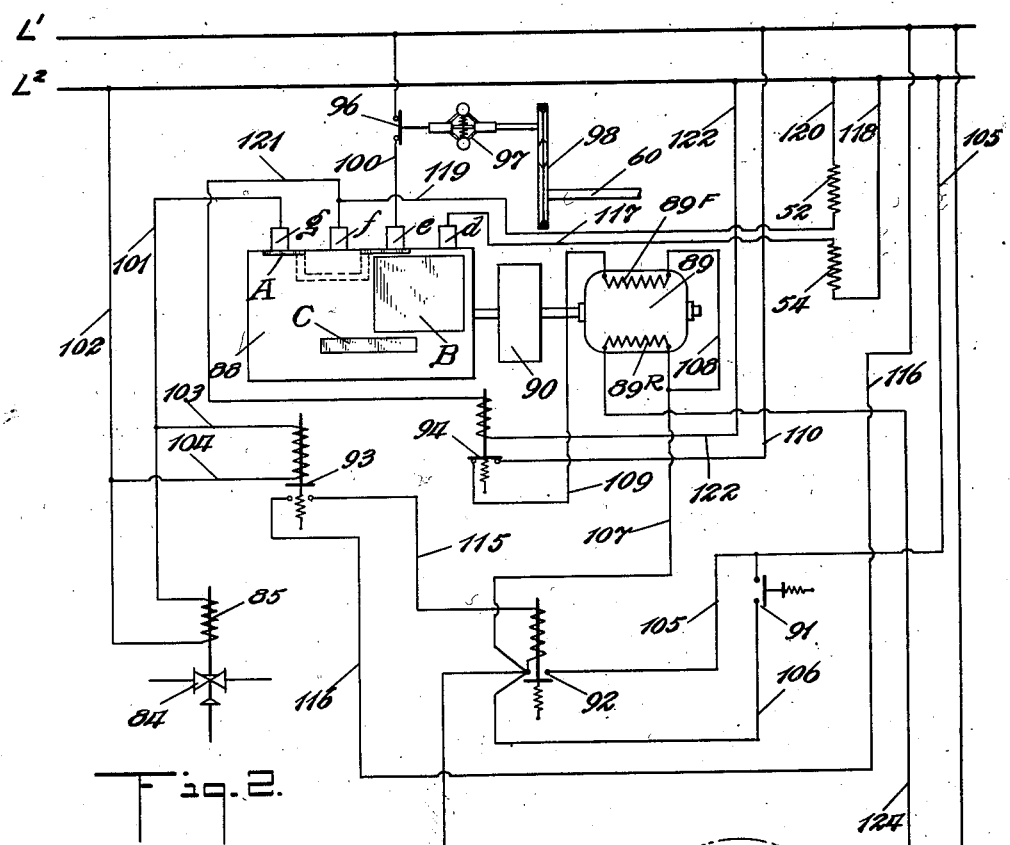
Fig. 2.
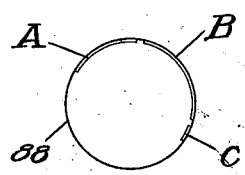
Fig. 3.
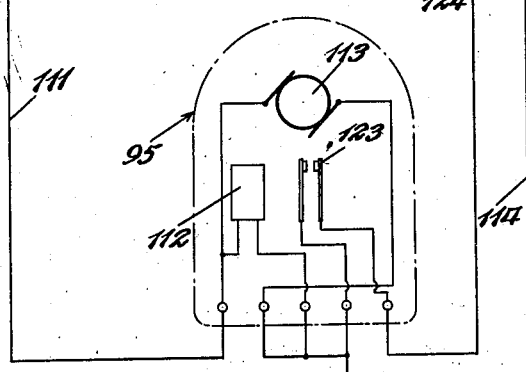
Fig. 4.
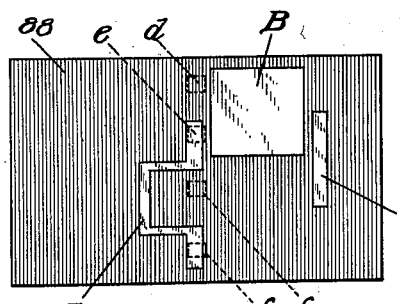
INVENTOR
CHARLES A. OLCOTT
BY HIS ATTORNEYS
Howson and Howson

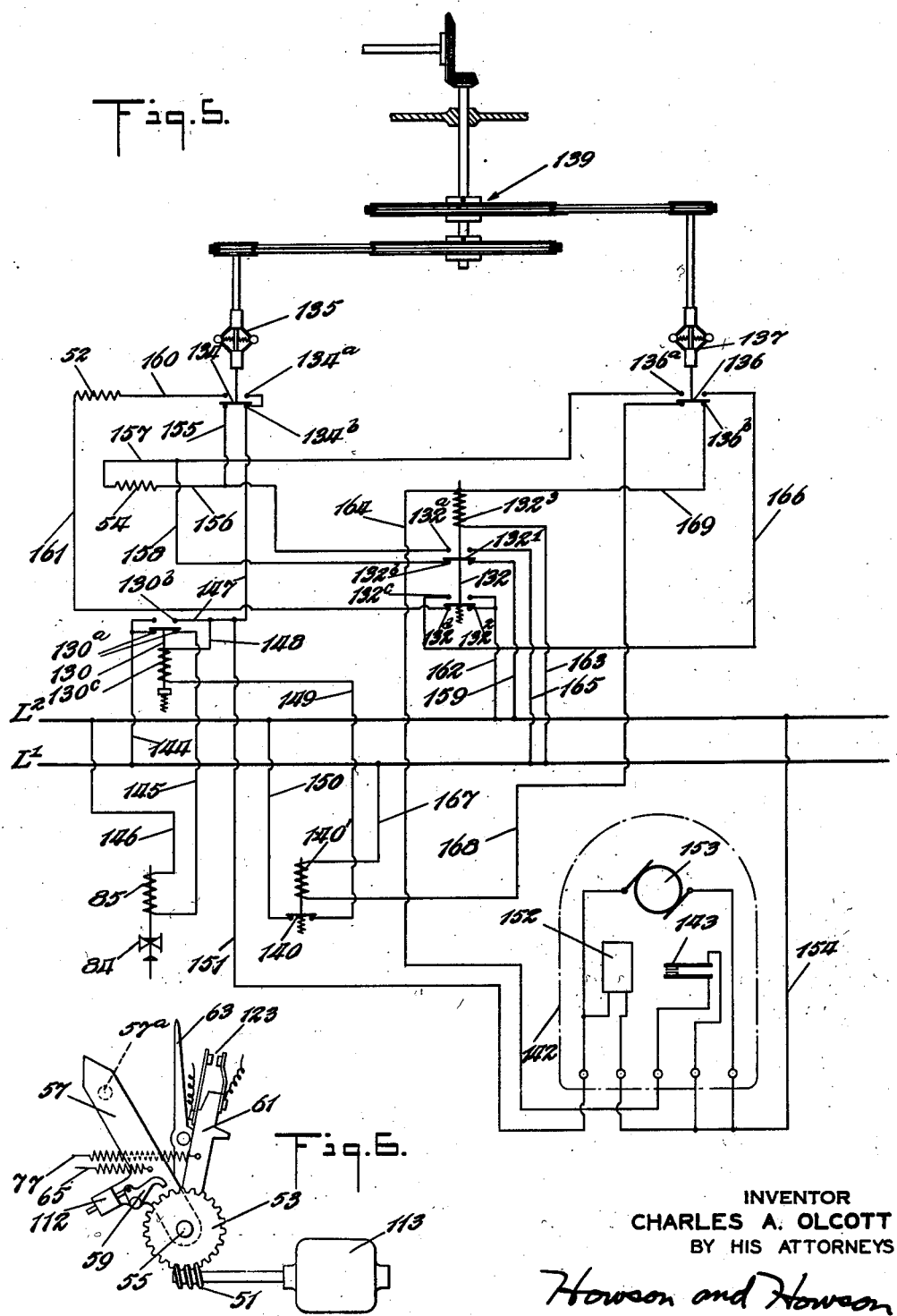

Patented Mar. 16, 1943

2,314,286

UNITED STATES PATENT OFFICE 2,314,286

GEAR DRIVE FOR CENTRIFUGAL MACHINES

Charles A. Olcott, West Milford, N. J.

Application May 24, 1938, Serial No. 209,780

5 Claims. (Cl. 210—71)

This invention relates to centrifugal machines for separating solid materials from containing liquids and more particularly to driving and controlling means therefor, and it is an object of this invention to provide a gear driving means for centrifugal machines having different gear ratios for the starting and full speed operation of the machine, and it is a further object of this invention to provide a control means for such gear driving means which automatically establishes the proper gear ratio for operation of the centrifugal machine at the desired time. It is also an object of this invention to provide a gear driving means so constructed that it prevents the centrifugal machine being operated at a speed in excess of a predetermined maximum speed.

In the drawings:

Fig. 2 is a diagrammatic view of an electric control means for the gear driving means of Fig. 1;

Fig. 3 is an end view of a drum switch used in the control circuit of Fig. 1;

Fig. 4 is a plan view showing the drum switch of Figs. 2 and 3 developed into the plane of the paper;

Fig. 5 is a view similar to Fig. 2 of a modified form of the control circuit; and Fig. 6 is a view in elevation showing operating parts of the timing means of the control circuits of Figs. 2 and 5.

Figure 1:
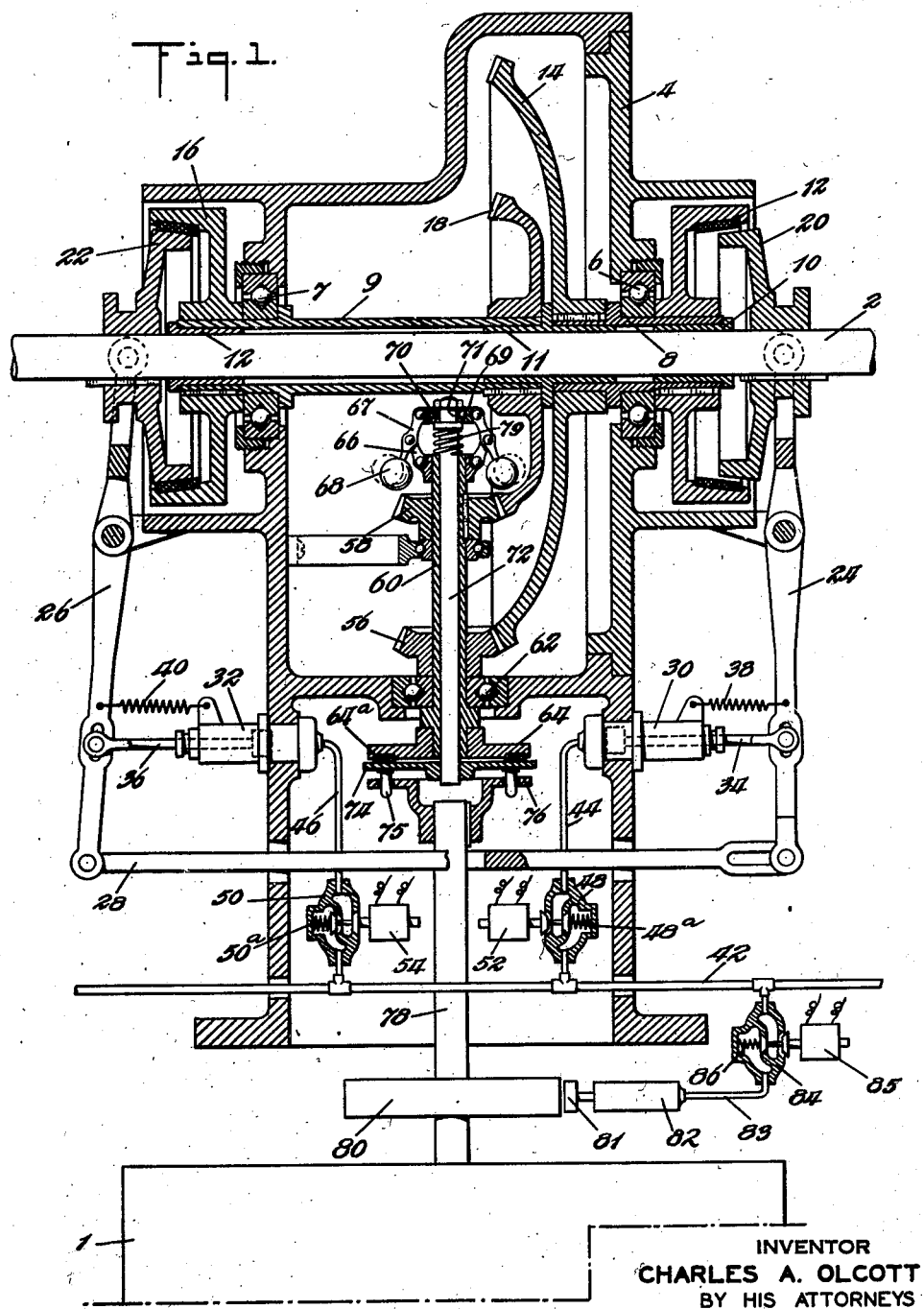
Fig. 1 is a view partly in section and partly diagrammatic of a gear driving means for a single centrifugal machine of a battery in accordance with this invention, the gear driving means serving to connect the centrifugal machine to the main driving shaft for the battery.

In the drawings there is shown a basket 1 of a centrifugal machine, the machine being one of a battery driven from a main drive shaft 2 which is operated by a synchronous electrical motor or other suitable driving means (not shown). To drive each basket 1 from the drive shaft 2 there is provided gearing comprising a gear casing 4 having openings in which are fitted roller bearings 6 and 7. Mounted in the bearings 6 and 7 and extending to opposite sides thereof are sleeves 8 and 9, carrying bearings 10, 11 and 12, in which the shaft 2 is rotatably mounted. Keyed to the sleeve 8 at opposite sides of the bearing 6 are a clutch member 12 and a gear 14 while keyed to the sleeve 9 at opposite sides of the bearing 7 are a clutch member 16 and a gear 18, the gear 18 having a smaller number of teeth than the gear 14. Cooperating with the clutch members 12 and 16 are clutch members 20 and 22, respectively, which are keyed to rotate with the main drive shaft 2 and are movable longitudinally thereof, being operated by levers 24 and 26, respectively, to engage and disengage their cooperating clutch members 12 and 16, respectively.

The levers 24 and 26 are pivotally mounted on the gear casing 4 and are connected by a link 28 which has a pivotal connection with the lever 26 and a pin and slot connection with the lever 24, the lengths of the link 28 and the slot therein being such that either pair of cooperating clutch members may be engaged and both may be disengaged but both cannot be engaged at the same time. To operate the levers 24 and 26 there are provided cylinders 30 and 32 mounted in extensions of the walls of the gear casing 4 and having pistons therein connected by rods 34 and 36 to the levers 24 and 26, respectively. Springs 38 and 40, connected to the levers and cylinders, serve to operate the levers to separate the cooperating clutch members. Pressure for operating the pistons in cylinders 30 and 32 is supplied through a pipe line 42 connected by branch pipes 44 and 46 to the cylinders. Three-way valves 48 and 50 mounted in the branch pipes are operated by solenoids 52 and 54, respectively, to positions for supplying pressure to the cylinders and, upon the solenoids being de-energized, are returned by the springs 48ª and 50ª, respectively, to positions for venting air from the cylinders.

The gears 14 and 18 mesh with pinions 56 and 58, respectively, fixed on a tubular shaft 60 journalled in a ball bearing 62 fixed in a wall of the casing 4. The shaft 60 projects beyond the casing 4 and at its outer end has fixed thereon a flange or clutch member 64, the outer face of which is provided with a friction surface or inserts 64ª. To the other end of the shaft 60 there are pivotally connected the inner ends of links 66, the outer ends of which are pivotally connected to intermediate points of the lever arms 67 of a centrifugally operated means, one end of the arms 67 having the weights 68 attached thereto while the other end of the arms is pivotally connected to the shell or outer race 69 of a ball bearing 70, the inner race 71 of which is fixed on the end of a shaft or rod 72. The rod 72 is slidably mounted in the tubular shaft 60 and projects from the outer end of the shaft 60 sufficiently to have fixed thereon a clutch member 74. Encircling the shaft 72 and confined between the bearing 70 and the end of the shaft 60 is a spring 79 of such strength and under such compression as to overcome the centrifugal action of the weights 69 and hold the clutch member 74 in engagement with the clutch member 64 to be driven thereby until the shaft 60 attains a speed slightly in excess of the speed necessary to rotate the basket 1 at its maximum speed. When the speed of shaft 60 becomes excessive the centrifugal action of the weights 68 overcomes the spring 79, causing the spring to be compressed and the shaft 72 operated to separate the clutch members 64 and 74.

Fixed to the clutch member 74 are pins 75 which slidably engage in openings in a flange 76 fixed on the shaft 78 which drives the basket 1. A brake drum 80 is secured to the shaft 78 and acting thereon is a brake shoe 81 operated by the piston of a brake cylinder 82. Pressure for operating the brake is supplied from the pipe line 42 through the branch pipe 83 and is controlled by a three-way valve 84 operated by a solenoid 85. The solenoid 85, when energized, operates valve 84 to supply pressure to the brake cylinder against the action of a spring 86 and when the solenoid is deenergized the spring returns the valve to a position in which the pressure is vented from the brake cylinder to atmosphere.

The clutch and brake solenoids of Fig. 1 can be energized and de-energized to control the operation of the clutches and brake by means of electrical circuits such as are shown in Fig. 2. These circuits comprise a drum switch 88 operated by a reversing electric motor 89 through a reducing gear 90. The circuits also include a push button switch 91 spring-biased to open position; a solenoid operated switch 92 spring-biased to open position and closed by energization of the solenoid; solenoid operated switches 93 and 94, spring-biased to closed position and opened by energization of the solenoids; and a timing switch 95 which establishes circuits for reversing the motor 89 after a predetermined period of operation. For convenience in distinguishing the circuits the motor 89 is shown as having separate windings for its forward and reverse operation. The drum switch 88 is provided with contacts A, B and C for establishing various connections with the brushes or contacts d, e, f and g. The contact B is arranged to establish connection between the contacts d and e throughout a movement of substantially 90 degrees of the switch 88 while the contact C establishes a connection between the contacts e and f and the contact A establishes a connection between contacts e and g during limited angles of movement of the switch 88. The control of the motor 89, however, is such that the switch 88 moves from a position in which contacts e and g are connected by the contact A through the angle in which contact B connects the contacts d and e to a position in which the contact C connects the contacts e and f and moves in the reverse direction until contact A again connects contacts e and g. There is also provided a normally closed switch 96 arranged to be opened by a centrifugal governor 97 or other speed responsive means driven by suitable means 98 from the shaft 60 which drives the basket 1 in the event the rotation of shaft 60 exceeds a predetermined rate.

The timing switch 95 may comprise, as shown in Fig. 6, suitable means for closing contacts 123 consisting of a motor 113 which, through worm 51, drives a gear 53 fixed on a shaft 55. Loosely mounted on the shaft 55 is an arm 57 having an extension thereon in which is pivoted a dog or pawl 59 arranged to be operated by a solenoid 112 when solenoid 112 is energized to engage the pawl with the teeth of gear 53 so that arm 57 will be moved with the gear wheel. Loosely mounted on the shaft 55 is an arm 61 on which are the contacts 123. The arm 61 may be positioned at different distances with respect to the arm 57 so as to vary the time taken by the arm 57 to approach and operate the contacts 123, the arm 61 being adjusted manually by means of an arm 63, the end of the arm 63 serving as a pointer on a graduated scale to indicate the time required for operating arm 57 to operate the contacts. To operate the contacts the arm 57 is provided with a pin 57$^a$ arranged to engage and close the contacts 123 after a predetermined period of operation depending upon the distance of the contacts from the arm 57 in the initial position of the arm 57. After the contacts 123 are closed, the arm 61 moves with the arm 57 until the circuit of motor 113 and solenoid 112 is opened, whereupon the motor 113 is stopped, solenoid 112 is deenergized and springs 65 and 77 return the arms 57 and 61 to their initial positions as shown in Fig. 6.

When the basket 1 is at rest the switch 88 will be in the position shown in Fig. 2 and a circuit will be established from one side $L^1$ of the power line through lead 100 and switch 96 to contact e, contact A on switch 88, contact g, lead 101 to solenoid 85 of the air brake valve 84 and lead 102 to the other side $L^2$ of the power line energizing the solenoid 85 and causing the brake shoe 81 to be applied to the drum 80 on the shaft 78. Leads 103 and 104 connected to leads 101 and 102 serve to energize the solenoid of switch 93 and hold this switch open at this time so as to keep open the circuit of the solenoid of switch 92 and permit this switch to be held open by its spring. To start rotation of the basket 1, the switch 91 is closed manually and held closed for a short time. Closing switch 91 establishes a circuit from the side $L^2$ of the power line through lead 105, switch 91, lead 106 to a contact of switch 92, leads 107 and 108, winding 89F of motor 89, lead 109, switch 94 and lead 110 to the other side $L^1$ of the power line. This causes motor 89 to operate switch 88 to shift contact A from contacts e and g and to engage contact B with contacts d and e. Closing the switch 91 also establishes a circuit through leads 105, 106, 111 and 114 for the timing switch 95, energizing the solenoid 112 and causing the motor 113 to start operation.

Movement of the contact A of switch 88 from the contacts e and g causes solenoid 85 and the solenoid of switch 93 to be de-energized, permitting the air brake valve 84 to be operated to vent pressure from the brake cylinder 82 and release the brake and permitting switch 93 to be closed by its spring to complete a circuit through the solenoid of switch 92 and leads 115 and 116, energizing the solenoid and closing switch 92 to complete a shunt around switch 91 which can now be released. Switch 92 now serves to complete the circuit for its own operating solenoid so this switch is held closed. Engaging contact B on switch 88 with the contacts d and e completes a circuit from the side $L^1$ of the power line through lead 100, switch 96, contacts e, B and D, lead 117, solenoid 54 and lead 118 to the side $L^2$ of the power line, energizing solenoid 54 and operating valve 50 to supply pressure to cylinder 32, operating lever 26 against the action of spring 40 to engage the clutch members 22 and 16 causing gear 18 to be driven by shaft 2 and operating through gear 58, sleeve 60, clutch members 64 and 74 and shaft 78 to start rotation of the basket 1.

The ratio of gears 18 and 58 is such that they will drive the basket at half-speed and the operation of switch 88 by motor 89 is timed to continue contact B in engagement with contacts $d$ and $e$ until the basket 1 is driven at half-speed whereupon the operation of switch 88 moves the contact B from the contacts $d$ and $e$, interrupting the circuit of solenoid 54 and permitting valve 50 to be operated by its spring $50^a$ to the position for venting pressure from the cylinder 32 to allow spring 40 to operate lever 26 to separate the clutch members 22 and 16. The movement of the switch 88 then engages contact C with contacts $e$ and $f$ establishing a circuit from the side $L^1$ of the power line through lead 100, switch 96, contacts $e$, C and $f$, lead 119, solenoid 52 and lead 120 to the opposite side $L^2$ of the power line, energizing solenoid 52 and operating valve 48 to supply pressure to cylinder 30 for the operation of lever 24 and the engaging of the clutch members 20 and 12. The engaging of clutch members 20 and 12 causes gear 14 to be driven by the shaft 2 and through gear 56, shaft 60, clutch members 64 and 74 and shaft 78 to drive the basket at full speed. Engaging contact C with the contacts $e$ and $f$ also completes a circuit through lead 121 from the contact $f$, solenoid of switch 94 and lead 122 to the side $L^2$ of the power line energizing the solenoid of switch 94 and opening the switch. The switch 94 being in the circuit of motor 89, opening the switch causes the motor to stop with the contact C engaging the contacts $e$ and $f$, the clutch members 20 and 12 maintained in engagement and the basket 1 driven at full speed.

Since the closure of switch 91 the motor of time switch 95 has been operating and at a predetermined time after starting, depending upon the setting of the switch, the time switch 95 operates to close contacts 123 establishing a circuit from the sides $L^2$ of the power line through lead 105, switch 92, lead 107, winding 89R of motor 89, lead 124, switch 123 and lead 114 to the opposite side $L^1$ of the power line, causing the motor 89 to start operating in the reverse direction, operating the switch 88 to move contact C from the contacts $e$ and $f$ and interrupting the circuit of solenoid 52. De-energizing solenoid 52 permits the valve 48 to be operated to vent pressure from the cylinder 30 and the lever 24 to be operated by spring 38 to separate the clutch members 20 and 12 so that the basket 1 is no longer driven at full speed from the shaft 2. Rotation of the switch 88 then brings contact B into engagement with the contacts $d$ and $e$, establishing a circuit through the solenoid 54 and causing the operation of lever 26 to engage clutch members 22 and 16.

As the basket 1 is still rotating under its momentum at substantially full speed and as the clutch members 22 and 16 and gears 18 and 58 would drive the basket 1 at only half speed, the basket 1 tends to speed up the shaft 2 when the clutch members 22 and 16 are engaged and the inertia of the shaft 2 and the other baskets connected thereto exerts a braking action on the basket 1 which is connected to the shaft through the clutch members 16 and 22. Should it happen that a number of baskets were simultaneously changed from being driven by the shaft 2 through their gears 14 and 56 and were connected to the shaft 2 through their gears 58 and 18, their momentum might be sufficient to raise excessively and almost instantly the speed of shaft 2 and of any baskets driven therefrom through their gears 14 and 56. The increase in the speed of the basket excessively above its normal full speed causes the centrifugal action of the weight members 68 to overcome the resistance of spring 69 and shift shaft 72 to separate the clutch members 64 and 72 and disconnect the basket 1 from the drive shaft 2 and prevent the basket 1 from being rotated at a dangerous rate. Rotation of the shaft 60 at an excessive speed would cause the switch 96 to be opened by the centrifugal means 97 and interrupts the circuit of the solenoid controlling operation of the clutch operating lever and maintains the circuit open so long as the speed of the shaft remains in excess of the predetermined limit.

In the usual operation the speed of shaft 2 is not raised sufficiently to cause operation of either of the centrifugal means for any of the baskets connected to the shaft 2 and the speed of the basket whose connection to the shaft has been changed is gradually reduced to half-speed by the time the switch 88 has been operated to shift contact B from contacts $d$ and $e$, interrupting the circuit of solenoid 54 and permitting the clutch members 22 and 16 to be separated, and engaging the contact A with the contacts $e$ and $g$ to establish the circuits for energizing the solenoid 85 of the brake valve 84 and the solenoid of switch 93, causing the brake shoe 81 to be applied to the drum 80 to stop rotation of the basket 1 and the switch 93 to be opened. Opening switch 93 interrupts the circuit of the solenoid of switch 92 and permits this switch to open, thus interrupting the circuits of motor 89 to stop switch 88 with contact A connecting contacts $e$ and $g$, further interrupting the circuit of the solenoid of switch 92 and interrupting the circuit of the motor 113 and solenoid 112 of the timing switch 95, stopping the operation of the timing switch and permitting return of its moving parts to their initial positions.

The arrangement of gear drive and control circuits above described provides for building up the speed of the basket from rest to half-speed by means of the lower gear ratio provided, thus greatly lessening the load thrown on the driving motor at each start of a basket and greatly reducing the wear and maintenance on the clutches and gearing. It also permits of maximum acceleration of the basket to half-speed and the building up of the speed of the basket from half-speed to full speed at the usual rate of acceleration. Changing to the lower gear ratio in decelerating the basket causes the basket being slowed to aid in driving the other basket and to reduce to some extent the power consumption of the driving motor during the slowing of the basket from full to half-speed. The centrifugal means 97 and 68 insure the speed of all baskets being kept below an excessive rate at this time and the timing devices insure the various operations taking place at the earliest possible time.

In the modified circuit arrangement shown in Fig. 5 for controlling the energization of the clutch operating solenoids 52 and 54 and the brake operating solenoid 85 there is provided a push button switch 130, spring-biased to a position connecting contacts $130^a$ and arranged to be held in a position connecting contacts $130^b$ by a solenoid $130^c$ when the solenoid is energized; a switch 132 having a pair of contacts $132^1$ and $132^2$ spring-biased to a position connecting contacts $132^b$ by contact $132^1$ and contacts $132^d$ by contact 132² and arranged to be held in a position connecting contacts 132ᵃ by contact 132¹ and contacts 132ᶜ by contact 132² by a solenoid 132³ when the solenoid is energized; a pair of switches 134 and 136 arranged to be operated by centrifugal means 135 and 137, respectively, which are driven through suitable connections 139 from the shaft 60 which drives the basket 1. The switches are biased to connect contacts 134ᵇ and 136ᵇ, respectively, when the basket 1 is stopped, and switch 134 is operated when the basket is rotating at slightly less than half-speed to disconnect contacts 134ᵇ and connect contacts 134ᵃ while switch 136 is operated when the basket speed is slightly greater than half-speed to disconnect contacts 136ᵇ and connect contacts 136ᵃ; a switch 140 spring-biased to closed position and operated by solenoid 140¹ to open position when the solenoid is energized; and a timing switch 142 which closes normally open contacts 143 a predetermined time after the switch is started operating.

When the basket 1 is stopped the switches are positioned as shown in Fig. 5 and a circuit is established from the side L¹ of the power line, lead 144, contacts 130ᵃ of switch 130, lead 145, solenoid 85 of the brake valve 84 and lead 146 to the other side L² of the power line, energizing the solenoid 85 and causing the brake shoe 81 to be applied to the brake drum 80. To place the basket 1 in operation, the switch 130 is operated interrupting the circuit of the solenoid 85 at the contacts 130ᵃ and completing a circuit between the contacts 130ᵇ. Interrupting the circuit of the solenoid 85 causes the brake to be released and connecting the contacts 130ᵇ completes a circuit from the side L¹ of the power line, lead 144, contacts 130ᵇ, leads 147 and 148, solenoid 130ᶜ of switch 130, lead 149, switch 140 and lead 150 to the side L² of the power line, energizing the solenoid 130ᶜ and causing the switch 130 to be held in position connecting contacts 130ᵇ. There is also a circuit completed through leads 147 and 151, solenoid 152 and motor 153 of the timing switch and lead 154 to the side L² which starts operation of the timing switch 142 and a circuit completed through lead 147, contacts 134ᵇ of switch 134, leads 155 and 156, solenoid 54, leads 157 and 158, contacts 132ᵇ of switch 132 and lead 159 to the other side L² of the power line which energizes the solenoid 54 and causes engagement of the clutch members 22 and 16 and acceleration of the basket 1 by the low ratio gears 18 and 56 towards half-speed.

As the speed of the basket 1 approaches half-speed at approximately 95% of half-speed, for example, the switch 134 is operated by the centrifugal means 135 opening the circuit of solenoid 54 at contacts 134ᵇ and establishing a connection between the contacts 134ᵃ. De-energizing solenoid 54 causes the clutch members 22 and 16 to be separated and connecting the contacts 134ᵃ establishes a circuit from the side L¹ of the power line through lead 144, contacts 130ᵇ, lead 147, contacts 134ᵃ, lead 160, solenoid 52, lead 161, contacts 132ᵈ of switch 132, and lead 162 to the other side L² of the power line, energizing the solenoid 52 and causing engagement of the clutch members 20 and 12 and driving of the basket 1 by the high ratio gears 14 and 56 to accelerate the basket to full speed rotation.

When the basket speed is slightly above half-speed, at 105% of half speed, for example, the centrifugal means 137 operates the contact 136 to interrupt the connection between the contacts 136ᵇ and to establish the connection between the contacts 136ᵃ. Operation of the basket at full speed continues until at the expiration of the predetermined period, depending upon the nature of the material being treated, for which the time switch 142 was set, the time switch 142 operates to close contacts 143 completing a circuit from the side L¹ of the power line, lead 163, solenoid 132³ of switch 132, lead 164, contacts 143 and lead 154 to the other side L² of the power line, energizing the solenoid 132³ and operating switch 132 to interrupt the circuit of solenoid 52 at contacts 132ᵈ and establishing a circuit through lead 165 from the side L¹ of the power line, contacts 132ᵃ of switch 132, lead 156, solenoid 54, lead 157, contacts 136ᵃ of switch 136, lead 166, contacts 132ᶜ of switch 132, and lead 162 to the other side L² of the power line to energize the solenoid 54. Deenergizing solenoid 52 causes the clutch members 20 and 12 to be separated so that the basket is no longer driven at full speed and energizing the solenoid 54 causes the clutch members 22 and 16 to be engaged and the deceleration of the basket to half-speed. As the speed of the basket approaches half-speed, but while it is still slightly in excess of half-speed, the switch 136 is operated by the centrifugal means 137 to interrupt the circuit of the solenoid 54 at the contacts 136ᵃ and to connect the contacts 136ᵇ. De-energizing the solenoid 54 causes the separation of the clutch members 22 and 16 and the disconnection of the basket 1 from the shaft 2 while the connection of the contacts 136ᵇ establishes a circuit from the side L¹ of the power line through lead 167, solenoid 140¹ of switch 140, lead 168, contacts 136ᵇ, leads 169 and 164, switch 143 and lead 154 to the side L² of the power line, energizing the solenoid 140¹ and operating the switch 140 to open the circuit of the solenoid 130ᶜ which holds the switch 130 in position connecting contacts 130ᵇ. De-energizing solenoid 130ᶜ permits the biasing spring of the switch 130 to operate the switch, interrupting the circuit of the timing switch motor 153 and solenoid 152 and establishing a connection between the contacts 130ᵃ. De-energizing the solenoid 152 permits return of the parts of the timing switch to their initial positions for the start of a subsequent operation, opening switch 143 and connecting contacts 130ᵃ establishes a circuit through 144, 145 and 146 for the energizing of solenoid 85 and the application of the brake 81 to stop rotation of the basket. As the speed of the basket is reduced below half-speed, switch 134 is operated by the centrifugal means to break the connection between the contacts 134ᵃ and establish a connection between the contacts 134ᵇ. Opening the switch 143 opens the circuits of the solenoid 132³ of switch 132 and solenoid 140¹ of switch 140 and permits return of these switches to their biasing springs.

The operation of the gearing with the control circuits of Fig. 5 is essentially the same as with the control circuits of Fig. 2, except that in Fig. 5 there is the speed controlled switch 134 instead of the switch 88 which is operated at a rate such as to allow the required time for the changes in the speed of the basket 1, and while a switch and speed responsive means corresponding to the switch 96 and speed means 97 of Fig. 2 have not been shown in Fig. 5 it is to be understood such a switch and its associated speed responsive means can be placed so as to open the circuit of the solenoid 52 of Fig. 5 and operate in the same manner as in connection with the control circuits of Fig. 2.

Where, in the claims, reference is made to a "timing means" for controlling the operation of the clutches such expression is to be considered as including the clutch controlling means as shown in Fig. 5 as well as the clutch controlling means as shown in Fig. 2.

What is claimed is:

1. In a centrifugal machine, a drive shaft common to a plurality of machines, a driven shaft, a basket operated by said driven shaft, drive means of different ratios for connecting said shafts, slip clutch means for selectively rendering said drive means effective to connect said shafts and timing means for controlling the operations of said clutch means, said timing means being constructed and arranged to operate said clutch means to provide a substantially continuous acceleration of said basket to the full speed thereof and to operate the clutch means to connect said shafts by said drive means of lower ratio for decelerating said basket.

2. In a centrifugal machine, a drive shaft common to a plurality of machines, a driven shaft, a basket operated by said driven shaft, drive means of different ratios for connecting said shafts, slip clutch means for selectively rendering said drive means effective to connect said shafts, timing means for controlling the operations of said clutch means, said timing means being constructed and arranged to operate said clutch means to provide a substantially continuous acceleration of said basket to the full speed thereof and to operate the clutch means to connect said shafts by said drive means of lower ratio for decelerating said basket and speed responsive means for disconnecting said basket from said driven shaft upon overspeeding of said shaft by baskets being decelerated.

3. The combination of a series of upright centrifugal separators, vertical operating shafts for said respective separators, a main horizontal driving shaft, two sets of connections between said horizontal shaft and each of said vertical shafts serving to drive the respective vertical shafts positively at widely different speeds, and controlling means operable to throw said sets of connections for each separator into and out of operation selectively.

4. The combination of a series of upright centrifugal separators, a main horizontal shaft for driving all of said machines, and independent driving mechanisms between said respective centrifugals and said main shaft, each of said mechanisms being constructed and arranged to drive its respective centrifugal from said shaft at both a high speed and a low speed, each of said mechanisms including a supplemental driving shaft telescoped on the main shaft and gearing driven by said supplemental shaft and through which motion from the main shaft is transmitted to its respective centrifugal, and controlling means for each separator to utilize either of said speeds at will and to shift from one speed to the other.

5. The combination of a series of upright centrifugal separators, vertical operating shafts for said respective separators, a main horizontal driving shaft, two sets of connections between said horizontal shaft and each of said vertical shafts serving to drive the respective vertical shafts positively at widely different speeds, both sets of said connections including gearing and one set serving to drive the operating shaft at a high speed and the other at a low speed and clutches associated with the respective sets and operable to throw them into and out of operation selectively.

CHARLES A. OLCOTT.